(12) United States Patent
Musson

(10) Patent No.: US 7,811,461 B2
(45) Date of Patent: Oct. 12, 2010

(54) WATER TREATMENT SYSTEM, APPARATUS AND METHOD

(75) Inventor: Andrew Peter Musson, Waipawa (NZ)

(73) Assignee: Iogenyx Pty Ltd, Melbourne, Victoria (AU)

( * ) Notice: Subject to any disclaimer, the term of this patent is extended or adjusted under 35 U.S.C. 154(b) by 1048 days.

(21) Appl. No.: 11/529,506

(22) Filed: Sep. 29, 2006

(65) Prior Publication Data

US 2007/0017877 A1    Jan. 25, 2007

Related U.S. Application Data

(63) Continuation-in-part of application No. 11/142,239, filed on Jun. 2, 2005, now Pat. No. 7,404,905.

(30) Foreign Application Priority Data

Aug. 6, 2004  (NZ) .................................... 534551

(51) Int. Cl.
*C02F 1/46* (2006.01)

(52) U.S. Cl. ..................... 210/748.01; 205/51; 210/743; 210/150; 210/167.2

(58) Field of Classification Search ............ 210/748.01, 210/170.9, 167.2, 243, 743, 150; 205/51
See application file for complete search history.

(56) References Cited

U.S. PATENT DOCUMENTS

4,208,258 A * 6/1980 Balko et al. ................. 205/771
4,382,866 A * 5/1983 Johnson ................. 210/748.16

* cited by examiner

*Primary Examiner*—Duane Smith
*Assistant Examiner*—Cameron J Allen
(74) *Attorney, Agent, or Firm*—Bio Intellectual Property Services LLC; O. M. (Sam) Zaghmout

(57) ABSTRACT

The invention relates to a water treatment apparatus, method and system for use in the treatment of an open or closed body of water including water in a vessel, pipe, reservoir, river, chamber, lake or similar bodies of water, the water being retained in a water containment means being referenced or tied to ground potential, the apparatus including an energisable material defined as an active electrode being configured and arranged for placement in the body of water, the active electrode being adapted to be energised or electrostatically charged with a negative electrostatic voltage charge from a power supply means, in use, to induce and set up an electrostatic field in the water causing contaminants in the water effected by the induced charge to bond and be removed from the water.

10 Claims, 7 Drawing Sheets

WATER TREATMENT SYSTEM, APPARATUS AND METHOD

CROSS-REFERENCE TO RELATED APPLICATIONS

This application is a continuation-in-part of U.S. patent application Ser. No. 11/142,239, filed on Jun. 2, 2005 now U.S. Pat. No. 7,404,905, which claims priority under [section] 119 of New Zealand patent application No. 534551, filed Aug. 6, 2004. The entire disclosure of these prior applications are hereby incorporated by reference.

TECHNICAL FIELD

This invention relates to water treatment systems, methods and apparatus. More particularly, but not exclusively, this invention relates to a water treatment systems, methods and apparatus utilising electrostatic fields for the removal of contaminants from water.

BACKGROUND ART

The treatment of water, and recycling water for reuse, commonly involves a variety of stages and various systems for effective treatment to increase the quality of the water. With water treatment, the removal of impurities, suspended solids and the like is desirable, but often involves a number of stages. Wastewater systems generally comprise a number of chambers such as a primary chamber(s) used for anaerobic breakdown and a secondary chamber(s) for aerobic breakdown of waste products, with wastewater being swiftly moved from one chamber to another, and then from the final chamber(s) into say a subterranean dispersal field. Such a system may not be as thorough as desired, particularly in respect of the treatment of suspended solids before being discharged into a dispersal field.

Potable water is commonly sourced from underground aquifers and other sources, and is often contaminated with dissolved or colloidal elements ranging from light metals such as calcium and sodium to heavier metals such as iron and manganese. The treatment and removal of such contaminants from potable water to produce water that is suitable for human use and consumption is desirable, but often involves a variety of treatment stages and filtering processes that can be expensive and complex operations with varying results.

It is a non-limiting object of the present invention to provide an apparatus for the treatment of wastewater and/or water that overcomes at least some of the abovementioned problems, or which provides the public with a useful choice.

It is a further non-limiting object of the present invention to provide a method of treatment of wastewater that overcomes at least some of the abovementioned problems, or which provides the public with a useful choice.

It is a further non-limiting object of the present invention to provide a system for the treatment of wastewater and/or water that overcomes at least some of the abovementioned problems, or which provides the public with a useful choice.

SUMMARY OF THE INVENTION

According to a first aspect of the invention there is provided a water treatment apparatus for use in the treatment of an open or closed body of water including water in a vessel, pipe, reservoir, river, chamber, lake or similar bodies of water, the water being retained in a water containment means being referenced or tied to ground potential, the apparatus including an energisable material defined as an active electrode being configured and arranged for placement in the body of water, the active electrode being adapted to be energised or electrostatically charged with a negative electrostatic voltage charge from a power supply means, in use, to induce and set up an electrostatic field in the water causing contaminants in the water effected by the induced charge to bond to solid surfaces in the water in the area effected by the induced charge and to permit removal from the water.

Optionally the negative voltage charge applied to the active electrode is between substantially about −0.001 and −24 volts relative to ground potential, and wherein the induced negative electrostatic voltage charge is applied in wastewater so as to enhance the bonding qualities of solid surfaces in the wastewater environment effected by the area of the induced charge such that the solid surfaces attract suspended solids in the wastewater and cause the bonding of aerobic bacterial cultures to the said surfaces.

Desirably the apparatus further comprises media introduced into the water effected by the induced negative voltage charge, and wherein the media includes material capable of being charged by a negative electrostatic voltage to cause the attraction of suspended solids in the wastewater and allow the bonding of such solids to the media.

Optionally the energisable material is adapted to form part of a base platform configured and arranged for placement in the flow of wastewater, the platform having a substantial surface area and a plurality of spaced apart apertures therein, in use, for allowing water to flow therethrough, and wherein the side of the platform away from the incoming flow of water is covered substantially with a media layer suitable for use in hosting bacterial cultures, and further including an electrified conductive mesh layer adjacent the media layer opposite the side in contact with the base platform, the mesh layer, in use, being supplied with an electrostatic negative voltage charge of substantially between −0001 and −24 volts DC to attract suspended solids in the wastewater and bond aerobic bacterial cultures to the media layer.

Advantageously the base platform is in the shape of a cylinder having a hollow central section adapted with a wastewater inlet, in use, allowing wastewater to flow therethrough the central section, and wherein the media layer is positioned substantially about the cylinder, and wherein the mesh layer is positioned substantially about the media layer and forming a negatively energised grid.

Preferably the active electrode is adapted to be energised or electrostatically charged, in use, with a negative electrostatic voltage charge of substantially between about −24 and −600 volts to induce and set up an electrostatic field with high voltage gradients in the water causing contaminants including inorganic dissolved cations in the water effected by the induced charge to diffuse and group toward the active electrode as the cathode, and anions to group toward anode points of charge in the field, and thus allow the bonding of the cations to the cathode and the anions to the anode and subsequent removal of said cations and anions.

Optionally the electrode is suspended in the body of water by means of a floatable platform, the platform being tethered or secured in position in the water by a platform support means. Preferably the platform is provided with a power supply means adapted to supply power to the active electrode, such power being sourced from at least one solar cell to generate power that is fed to the power supply means being adapted with power filtering and conditioning means.

Optionally the active electrode is a disc electrode suspended in the water by a non-conductive disc spacer means, the disc electrode having a large surface area and being positionable at a point in the electrostatic field subject to the induced charge.

According to a second aspect of the invention there is provided a method of treatment of an open or closed body of water, the water being retained in a water containment means, such water being contained in a vessel, reservoir, river, lake or chamber or similar bodies of water being referenced or tied to ground potential, the method including the steps of:

a.) placing an energisable material defined as an active electrode into the body of water;

b.) energising the active electrode with a negative voltage charge relative to ground potential to induce an electrostatic field in the water; and c.) allowing contaminants in the water effected by the induced charge to bond to solid surfaces in the water effected by the induced charge and be removed from the water.

Advantageously the method can be desirably applied to treat wastewater wherein in step b. the negative voltage charge being applied to the active electrode is between substantially about −0.001 and −24 volts direct current, and wherein in step c. the contaminants being removed are suspended solids and aerobic/anaerobic bacterial cultures in the wastewater attracted to the active electrode and solid surfaces in the wastewater effected by the area of the induced charge such that the solid surfaces attract suspended solids in the wastewater and cause the bonding of aerobic bacterial cultures to the said surfaces.

Advantageously the method can additionally be applied to treat water wherein in step b. the negative voltage charge being applied to the active electrode is between substantially about −25 and −600 volts direct current so as to induce and set up an electrostatic field with high voltage gradients in the water, and wherein in step c. the contaminants being removed in the water are inorganic dissolved cations in the water effected by the induced charge to diffuse and group toward the active electrode as the cathode, and anions to group toward anode points of charge in the field, and thus allow the bonding and subsequent removal of said cations and anions.

Desirably the method further includes step D. of removing crystalline compounds formed as a result of the water treatment process from the electrode and chemically treating the compounds to separate the compounds into their pure elements for reuse.

According to a third aspect of the invention there is provided a water treatment system for use in the treatment of an open or closed body of water including water in a vessel, pipe, reservoir, river, chamber, lake or similar bodies of water, the water being retained in a water containment means being referenced or tied to ground potential, the system including an energisable material defined as an active electrode being configured and arranged for placement in the body of water, the active electrode being adapted to be energised or electrostatically charged with a negative electrostatic voltage charge from a power supply means, in use, to induce and set up an electrostatic field in the water causing contaminants in the water effected by the induced charge to bond to solid surfaces in the effected water and be removed from the water.

Advantageously the system can be desirably applied to treat and remove suspended solids in wastewater wherein the negative voltage charge applied to the active electrode is between substantially about −0.001 and −24 volts relative to ground potential, and wherein the induced negative electrostatic voltage charge is applied in wastewater so as to enhance the bonding qualities of solid surfaces in the wastewater environment effected by the area of the induced charge such that the solid surfaces attract suspended solids in the wastewater and cause the bonding of aerobic bacterial cultures to the said surfaces.

Optionally the system further comprises media introduced into the water effected by the electrostatic field, and wherein the media includes material capable of being charged by a negative electrostatic voltage to cause the attraction of suspended solids in the wastewater and allow the bonding of such solids to the media.

Advantageously the energisable material is adapted to form part of a base platform configured and arranged for placement in the flow of wastewater, the platform having a substantial surface area and a plurality of spaced apart apertures therein, in use, for allowing water to flow therethrough, and wherein the other side of the platform from the flow of water is covered substantially with a media layer suitable for use in hosting bacterial cultures, and further including an electrified conductive mesh layer adjacent the media layer on the other side from the base platform, the mesh layer, in use, being supplied with an electrostatic negative voltage charge of substantially between −0001 and −24 volts to attract suspended solids in the wastewater and bond aerobic bacterial cultures to the media layer.

Desirably the electrode is adapted to be energised or electrostatically charged, in use, with a negative electrostatic voltage charge of substantially between about −24 and −600 volts to induce and set up an electrostatic field with high voltage gradients in the water causing contaminants including inorganic dissolved cations in the water effected by the induced charge to diffuse and group toward the active electrode as the cathode, and anions to group toward anode points of charge in the field, and thus allow the bonding and subsequent removal of said cations and anions from the water.

Additionally the active electrode is configured and arranged in the water for the collection of hydrogen.

Optionally the active electrode is configured and arranged in salt water to collect and remove sodium and/or chlorine.

BRIEF DESCRIPTION OF THE DRAWINGS

Preferred and alternative embodiments of the invention will now be illustrated, by way of example only, with reference to the accompanying drawings in which.

DETAILED DESCRIPTION OF THE DRAWINGS

Figure 1:
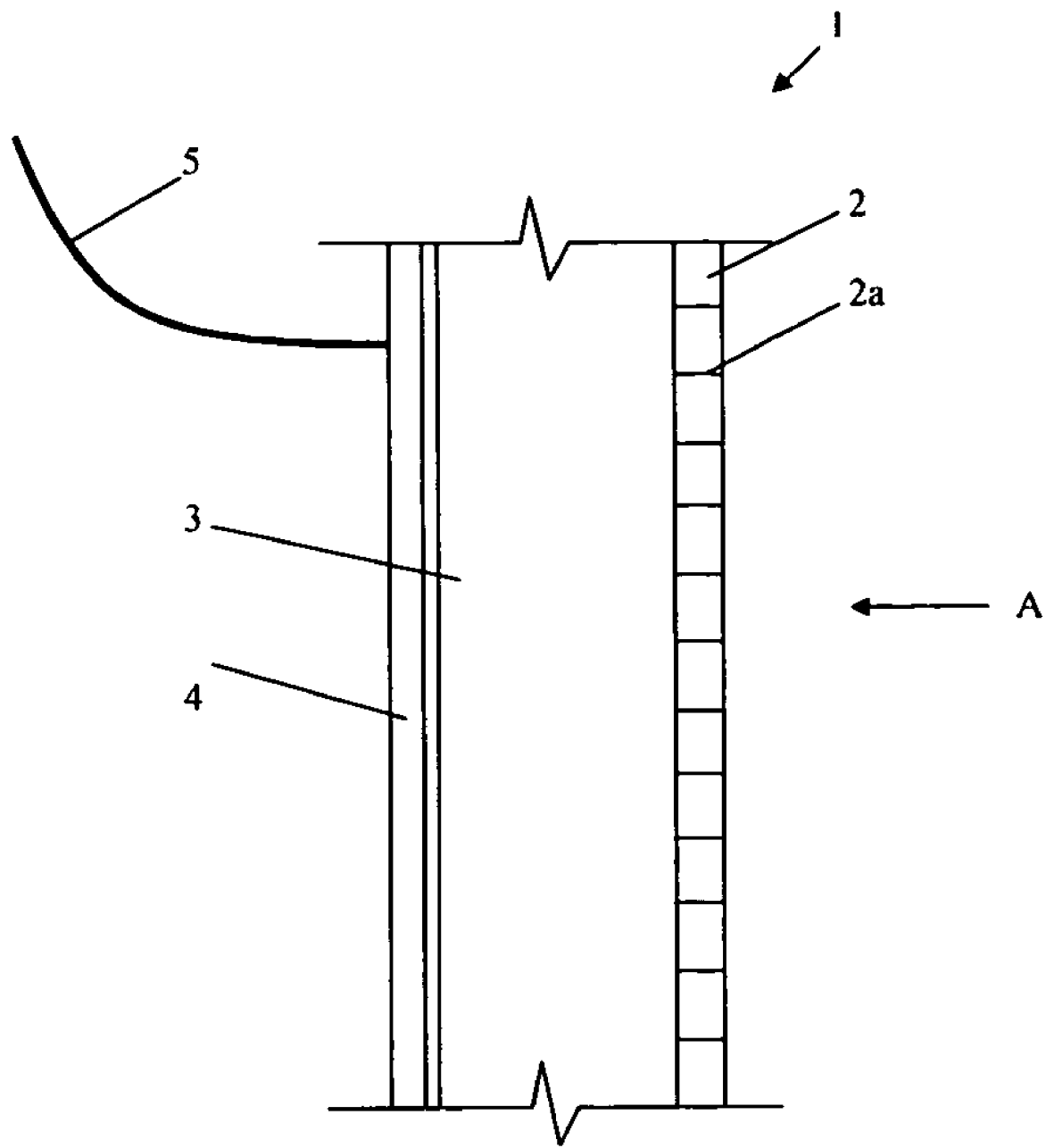
FIG. 1: illustrates an end view showing a cut away section of the sandwich construction of layers of the apparatus 1.
Figure 2:
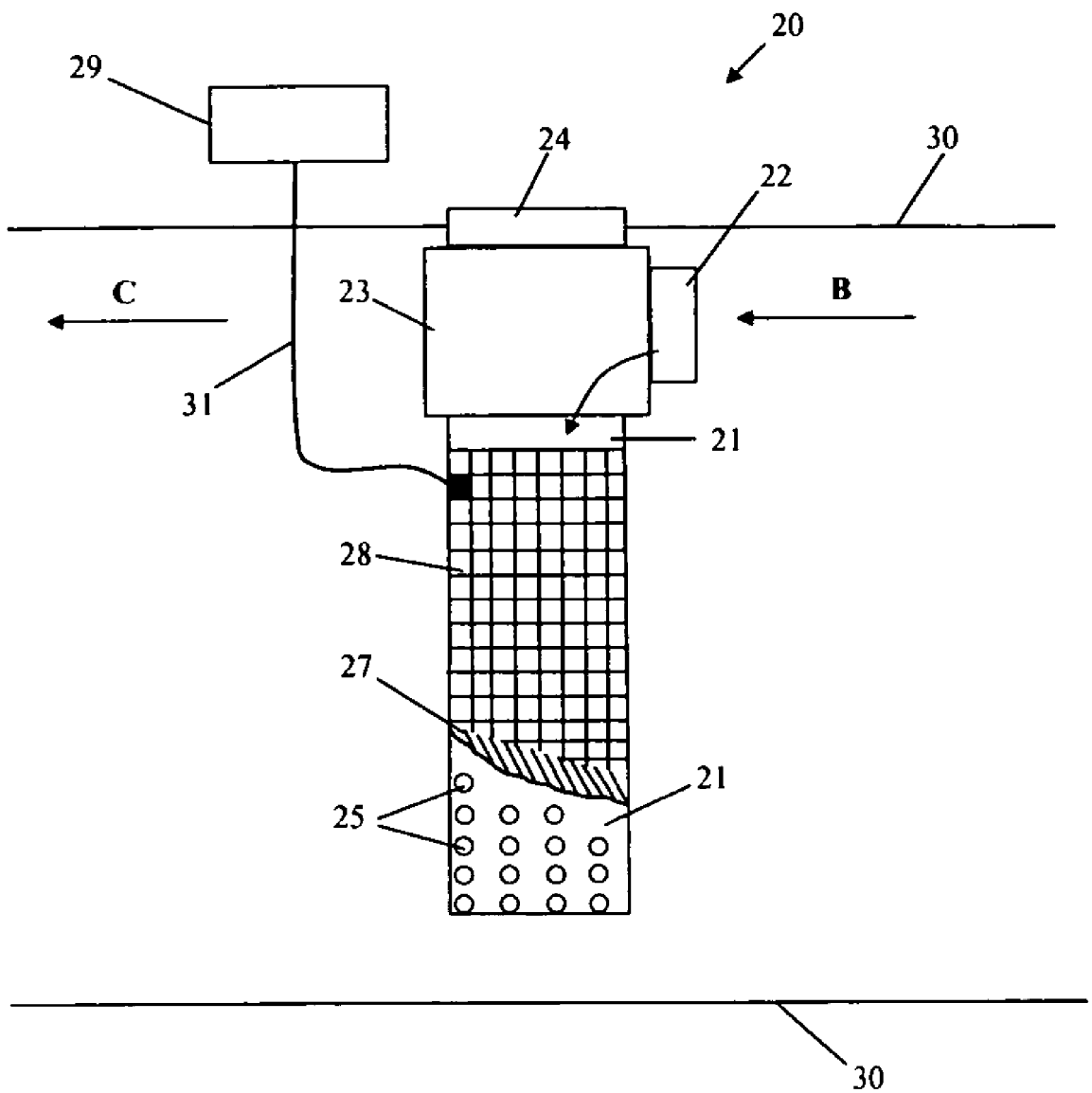
FIG. 2: illustrates a side view of a water treatment apparatus 1 with a cut away section in the lower end of the apparatus 1, in accordance with a first preferred embodiment of the invention.

Referring to FIGS. 1 and 2, a water treatment apparatus 1, according to a preferred embodiment of the invention, is illustrated.

The apparatus of the invention 1 is intended to be submerged or placed into wastewater in wastewater treatment systems to improve the quality of discharged wastewater flowing out of such treatment systems. The apparatus 1 is particularly suitable for treatment of suspended solids formed or passed on from earlier stages in the treatment of wastewater, and therefore is particularly suitable for use at both or either the early, mid and/or the later stages of the process in the conduits or pipes between chambers, and/or in aeration and clarification chambers of wastewater treatment systems. The apparatus 1 allows for at least some suspended solids and other such bacterial cultures and the like to remain in the treatment system for an extended period of time for further processing and treatment.

Turning to FIG. 1, the cross section cut away view illustrates the sandwich construction of the media platform for attracting and acting on suspended solids and otherwise when in use in a water treatment system. The apparatus 1 includes a base platform 2 for defining the shape of the biological platform of the invention, and is made of any durable and resilient material suitable for use and placement in wastewater for extended periods of time. Suitable materials advantageously include non-conductive materials such as polymers including polyvinyl chloride (PVC) or any other suitable polymer. Alternatively, ceramics, hardened glass or metal covered with a non-conductive layer or any combination thereof may be used.

Preferably perforations 2a are provided in the base platform 2 to allow wastewater to seep through. In the example perforations in the form of a plurality of apertures 2a are provided. The size of the apertures 2a will be such as to allow wastewater to pass or seep therethrough but yet maintain the integrity of the base platform 2 in the face of a constant flow of wastewater at and about the base platform 2. It will be appreciated by those skilled in the art that the base platform 2 can comprise any shape or configuration for supporting a media layer 3 in the desired position and orientation such that the media layer 3 maintains a relatively high surface area.

A media layer 3 can be desirably positioned and arranged on the other side of the base platform 2 from the direction of flow of wastewater, indicated by arrow A. The media layer is for the purpose of hosting bacterial, particularly large cultures, and allowing suspended solids to be bonded thereto during the treatment process. This process allows, inter alia, for the breakdown of suspended solids that has not been fully broken down during the primary and secondary stages of treatment of wastewater, and before the wastewater flows into a dispersal field or otherwise.

The composition of the media layer includes any suitable durable and resilient material for effecting the purpose, and is preferably a non-woven fibre, and more preferably is a carbon impregnated non-woven fibre. This preference is due to the properties of carbon impregnated non-woven fibre in that is offers a high surface working area and is a relatively convenient material to apply to the sandwich construction of the apparatus 1. The surface area value for the media layer 3 can be any desirable and suitable value or density, and desirably in this non-limiting embodiment, the effective surface area value is advantageously between 800 and 1500 square metres per gram. This composition of media layer 3 allows for the proliferation of bacterial cultures, and such value is considered achievable when a carbon impregnated non-woven fibre is used. The thickness of the layer can be any suitable thickness to enable wastewater to flow therethrough, and may desirably include a thickness of between 2 to 10 millimetres, and more preferably is between 4 to 8 millimetres.

A mesh layer 4 is configured and arranged over the media layer 3. Such an arrangement conveniently sandwiches and restrains the media layer 3 between the base platform 2 and the mesh layer 4. The mesh layer 4 is adapted to be energised and therefore is made of a suitable conductive material capable of maintaining its integrity during operation substantially submerged in wastewater. Suitable materials include metal, and more preferably is a non corrosive material, and preferably is a stainless steel mesh or grid having a power cable 5 attached thereto at any convenient location on the mesh or grid layer 4 to supply the required electrostatic charge to the mesh layer 4.

The energised mesh layer 4 is advantageously electrified with an electrostatic negative voltage charge from a direct current power source. Any desirably voltage forming a potential difference of the mesh layer 4 to ground potential can be applied, depending on the application, and therefore it is considered that the mesh layer 4 and power source can be adapted to apply even a medium to high voltage, and a high voltages, as required. Further, the power source may be adapted to supply a variable voltage, and such voltage applied may be adjusted during the period of operation of the apparatus 1. Finally, it will be appreciated that any type and level of voltage charge that serves to allow bacterial cultures and suspended solids, inter alia, to bond to the media layer 3 during operation may be applied. This acknowledges that the apparatus 1 may be adapted to a variety of applications, and types of wastewater treatment systems.

In this non-limiting preferred embodiment, the negative charge may desirably be a lower voltage, and is substantially about −24 volt direct current charge, the charge being negative to earth or ground potential. It will be appreciated that the voltage charge can be varied quite substantially, although it will be appreciated that substantially −24 v DC will suffice to enhance the surface bonding qualities of the bacterial cultures on the media layer 3, and aid in the build up of suspended solids attracted to, and being bonded to, the media layer 3 during operation.

The power source may be located anywhere about the wastewater treatment system, and may be incorporated adjacent the base platform 2. Preferably, the power source is located externally of the base platform 2 and power is supplied via an insulated cable 5 into the wastewater system. The electrostatic charge applied to the mesh layer 4 is designed to attract suspended solids in the wastewater to the media layer 3 during operation.

Referring now more particularly to FIG. 2, a side view of a water treatment apparatus 20, as placed in the flow of wastewater within a pipe or chamber 30, in accordance with a preferred embodiment of the invention, is illustrated.

A base platform 21 is preferably a polymer conduit, and is advantageously in the shape of a cylinder. It can be oriented in any desirable direction, and in this embodiment is shown as being about 100 millimetres in diameter, and about 370 millimetres in length. Any desirable dimensions can be applied depending on the application.

The base platform 21 is adapted with a wastewater inlet 22 adjacent the top section 23 of the cylinder, and positioned in the side of the cylinder. Further, a breather section 24 is attached to the top section 23 and extends above the water level of the top of the chamber 30. As seen, the cylinder is preferably oriented in a substantially vertical position, thus allowing wastewater from upstream to flow into the inlet 22 in the direction of arrow B. The flow of wastewater exists downstream in the direction of arrow C.

The base platform 21 is provided with perforations 25 to allow wastewater to seep through. In this preferred embodiment, perforations in the form of a plurality of apertures 25 are provided. The size of the apertures 25 will be such as to allow wastewater to pass or seep therethrough from the central section, or from the outside of the cylinder, but yet maintain the integrity of the base platform 21 in the face of a constant flow of wastewater at and about the base platform 21.

A media layer 27 can be desirably positioned and secured about the outside of the cylindrical base platform 21. The media layer 27 is similar to that as described with reference to FIG. 1 and details will not be repeated.

A mesh layer 28 is configured and arranged over the media layer 27. Such an arrangement conveniently sandwiches and restrains the media layer 27 between the base platform 21 and the mesh layer 28. The mesh layer 28 is adapted to be energised and therefore is made of a suitable conductive material such as metal, and more preferably is a non corrosive material. Preferably the grid or mesh layer 28 is formed of stainless steel.

The energised mesh layer 28 is advantageously electrified with an electrostatic negative voltage charge from a direct current power source. The charge may desirably be a −24 volt direct current charge, the charge being negative to earth or ground potential. It will be appreciated that the voltage charge can be varied quite substantially, although it will be appreciated that substantially −24 v DC will suffice to enhance the surface bonding qualities of the bacterial cultures on the media layer 27, and aid in the build up of suspended solids attracted to, and clinging to, the media layer 27 during operation.

A suitable power source 29 is associated with the mesh layer 28, and a power cable 31 is attached to any convenient location on the mesh or grid layer 28 to supply the required electrostatic charge. The power source 29 may be located anywhere about the wastewater treatment system, and may be incorporated adjacent the base platform 21. Preferably, the power source 29 is located externally of the base platform 21 and chamber 30 as shown, and power is supplied via an insulated cable 31 into the wastewater system. The electrostatic charge applied is designed to attract suspended solids in the wastewater to the media layer 27 during operation.

Any suitable method of suspension of the apparatus 1 or attachment in the stream of wastewater in the treatment system may be employed, and it will be appreciated that a person skilled in the art should have the ability to install the apparatus 1 in a chamber or water pipe, as required.

Figure 3:
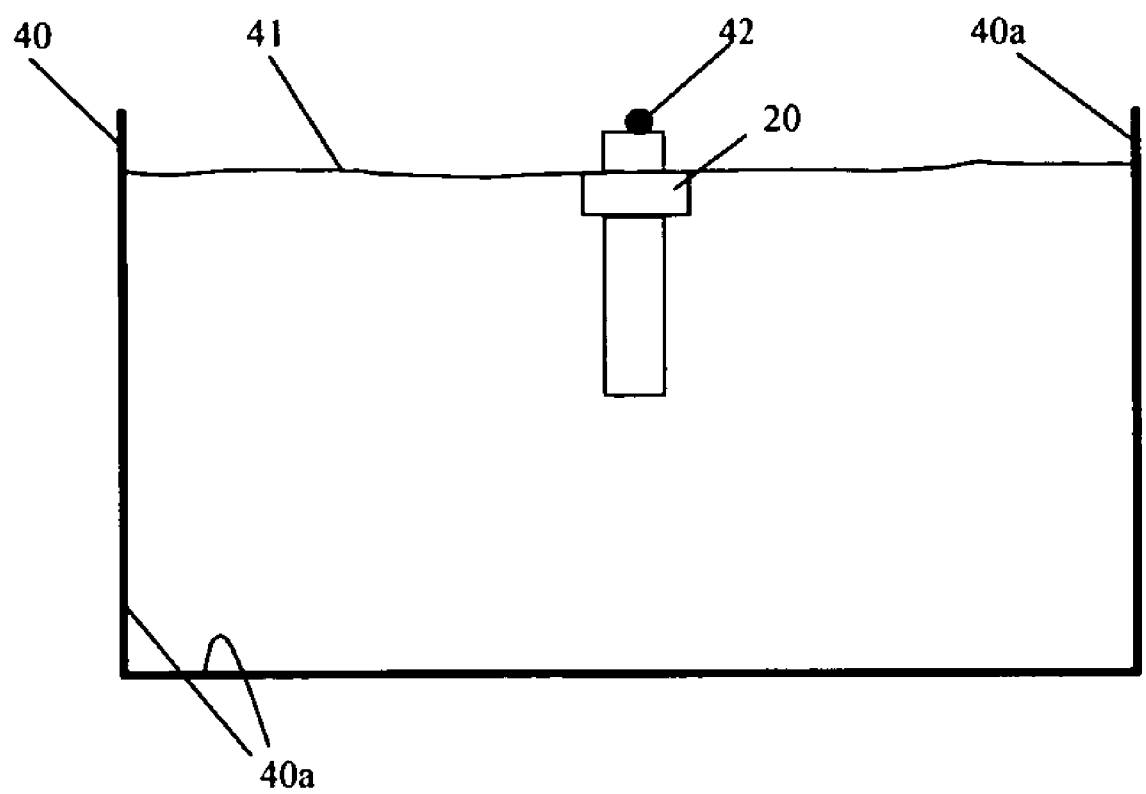
FIG. 3: illustrates a side view of a water treatment apparatus 20 in accordance with a second preferred embodiment of the invention.

Referring to FIG. 3, a side view of the water treatment apparatus 20 being electrically associated with a tank or chamber 40, in accordance with second preferred embodiment of the invention, is illustrated.

In the second preferred embodiment the apparatus 20 is seen to be advantageously electrically associated with the chamber 40. The chamber 40 is defined as being any vessel or conduit capable of retaining wastewater 41 and associated materials, and includes a tank, conduit, channel, pool, pond or the like. In this second embodiment the chamber 40 is shown as an open tank.

In FIG. 3 the chamber 40 may be an oxidation pond that may itself be earthed to ground potential, and the walls may be made of concrete or such composition, or be a tank that is made of a plastics material, whether conductive or not.

The apparatus 20 when supplied with a low voltage that is negative when referenced to earth or to the surrounding environment, is seen to function, in part, as an active electrode. This arrangement sets up an environment about the apparatus 20 whereby the installation is in circuit and the environment is used as a reference electrode.

Figure 4:
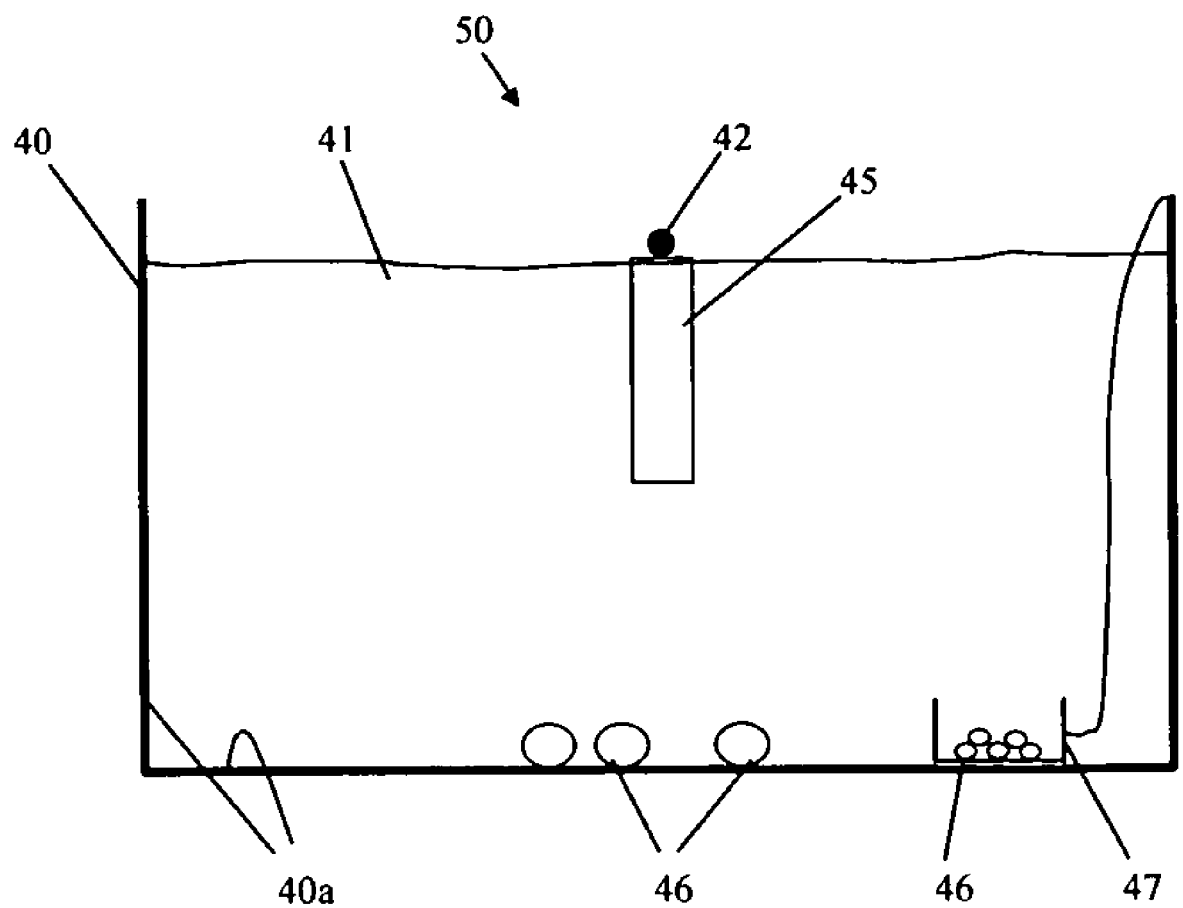
FIG. 4: illustrates a side view of a water treatment apparatus 50 in accordance with a third embodiment of the invention.

The main biological platform desirably has a high surface area and is preferably the cylindrical platform referred to as the media layer 27 in the apparatus 20 to which the mesh layer 28 is sandwiched. This mesh layer 28 is preferably electrified with an electrostatic negative voltage charge from a direct current power source supplied via cable 31 from the power source 29 as seen in FIG. 2. Such construction of the apparatus 20 is illustrated and described in detail with reference to FIGS. 1 and 2 and further detailed description will not be repeated. However, as seen in FIG. 3, the apparatus 20, or alternatively, a negatively charged energisable material 45 as seen in FIG. 4, forms an active electrode when mounted in a partially or fully submerged position in an oxidation pond or treatment tank by being suspended underneath the cable 42 and being associated with the cable 42 such that the high surface material forming the biological platform can be suitably charged to attract suspended solids in the wastewater being treated.

The charge is generally a low voltage charge, and is desirably in the range of between −0.001 and −24 volts, and more preferably between about −4 and −12 volts. The charge being negative when referenced to earth or ground potential. It is envisaged within the scope of the invention that the voltage charge can be adjusted as required to control the amount of bonding activity in the wastewater treatment system.

The apparatus 20 becomes an active electrode in the system, and in this respect the surrounding area becomes part of the electrical circuit due to the electrostatic field set up about the apparatus 20. It is considered that the active electrode sets up an electrostatic field that results in negative voltage charges being induced in the wastewater that have the highest potential difference at and adjacent the apparatus 20, and reduces in the areas radiating away from the apparatus 20 such that the lowest charge is located at the inner wall 40a.

It is seen that the charged surface areas that make contact with the wastewater within the chamber 40 attract suspended solids more than surfaces that do not have an induced charge by reason of the proximity of an active electrode. Although the areas and associated surfaces of the chamber 40 furthermost from the apparatus 20 may be exposed to a minimal charge, such surfaces can attract suspended solids and such solids can bond thereto. Furthermore, in accordance with an aspect of the invention, the voltage charge can be varied or adjusted quite substantially depending on the application, and such adjustment can be effective in enhancing the surface bonding qualities of the bacterial cultures attracted to the media layer 27, and to the secondary biological platform(s) of the wastewater surfaces proximate to the apparatus 20, and more particularly the inner walls 40a of the chamber 40. It is also envisaged within aspects of the invention that additional suitable media capable of attracting suspended solids to its surfaces, such as, for example, pumas and the like, can be placed into the wastewater in the chamber 40. It is seen that the media can receive an induced negative charge from the apparatus 20 and its surfaces may be enhanced to attract suspended solids and such solids can bond thereto.

It is seen during operation that an electrostatic charge as applied to the apparatus 20 is designed to attract suspended solids in the wastewater to bond to the media layer 27 and to bond to the secondary biological platforms of the inner surface(s) of the chamber 40.

Referring now to FIG. 4, a side view of a water treatment system 50, in accordance with a third embodiment of the invention, is illustrated.

The energisable material 45 is energised so as to induce a negative voltage charge in the wastewater of the chamber 40. The material 45 in this respect may be similar to the mesh layer 28 described with reference to the apparatus 20. However, instead of the media layer 27 serving as part of a biological platform for attracting suspended solids thereto as in the apparatus 20, the material 45 serves to induce a suitable negative voltage charge in the wastewater 41 of the chamber 40 to enhance the surface bonding qualities in proximity to the material 40 including the inner wall or walls 40a of the chamber 40 and any introduced suitable media 46 placed or suspended in the chamber 40 such as, for example only, pumas, zeolites or a combination thereof.

It is seen that the induced negative voltage charge can desirably increase the surface bonding qualities such that suspended solids in the wastewater 41 will be attracted to the surfaces and can bond thereto. The media 46 may include any suitable mineral, and pumas and zeolites are particularly porous materials that can serve well in the invention in the process of bonding suspended solids in wastewater 41 thereto.

It is envisaged that media 46 may be contained or cradled in any suitable container 47 that can be tethered and submerged in the chamber 40 as required. Such containers may be removable and replaced as required.

Referring to FIG. 5 to 9, a water treatment apparatus, method and system, according to alternative embodiments of the invention, are now described and illustrated.

The water treatment system is also advantageous in the treatment of water such as, for example, potable or raw water and the like. More particularly, the water treatment system is useful in removing contaminants in the water such as, for example, dissolved inorganic cations, which can form the bulk of contaminates in untreated water.

For purposes of ease of description, references herein to a reservoir will refer to any naturally occurring body of water or man-made vessel capable of containing, conveying or storing water without limiting the application of the invention in any way. The system may therefore be used for the treatment of water in, for example only but not limited to, an open or closed conduit, pipe, canal, waterway, reservoir, tank or chamber, or from a river, stream, lake, pond, spring or the like.

Additionally, references herein to cations will additionally refer to any molecules or compounds which are cation by nature without limiting the application of the invention in any way.

The water treatment system includes a water treatment apparatus 51 adapted to be partially or fully submerged into a body of water in a wide variety of applications.

Figure 5:
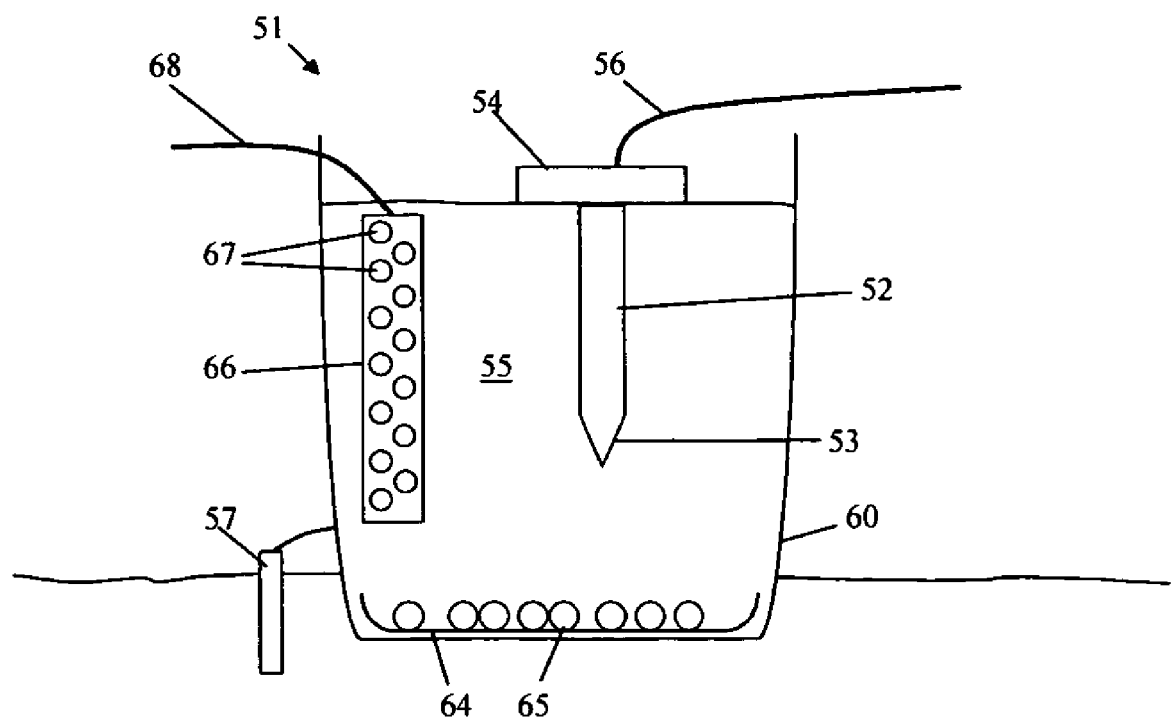
FIG. 5: illustrates a schematic side view of a water treatment apparatus 1 being suspended in a body of water in a reservoir in accordance with a fourth embodiment of the invention.
Figure 6:
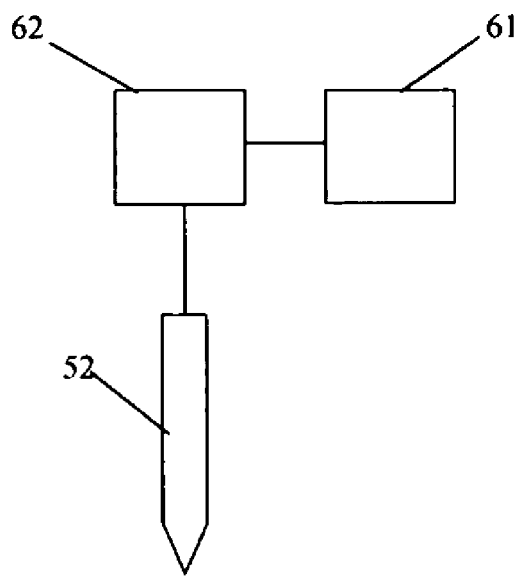
FIG. 6: illustrates a schematic block electrical diagram of the main components feeding power to the electrode 2 of FIG. 5.

Referring now to FIGS. 5 and 6, a water treatment apparatus, generally referred to as 51, being suspended in a body of water in a reservoir 60, is illustrated.

It is seen that a water vessel or reservoir 60 retaining the body of water is either referenced to ground potential or is earthed or tied to ground potential optionally by a suitable earth stick 57 or otherwise. As illustrated, the reservoir 60 is associated with and is referenced to ground potential and, in the case of a man made structure, is advantageously made of any suitable durable and resilient material such as, for example, concrete or other such cementious material, or a conductive plastics material. In one desirable application of a reservoir 60 that is in the form of a tank, it is seen that during the treatment process, the voltage gradients delivered by the apparatus 1 radiate outwardly from the point of origin in a substantially uniform manner.

The water treatment apparatus 51 includes at least one electrode 52 capable of being energised or electrostatically charged with a low voltage direct current ("DC") charge to define an active electrode 52. The active electrode 52 is configured and arranged and electrically connected for use in a body of water for treatment purposes.

The electrode 52 is made of any conductive material capable of maintaining its integrity and electrical function during operation, and which is capable of being substantially submerged in water for extended periods of time. Suitable materials, preferably of a non corrosive nature, including a metal or metal alloy or a conductive plastics material, can be used. Desirably the electrode 52 is constructed from stainless steel or other such metal or alternatively a suitable conductive plastics material, although it is considered that the material used can, in part, be selected with considering its electrical properties relative to the electrical properties of the circuit being created and the particular installation and application of the invention.

The shape and size of the electrode 52 can also be determined or selected, in part, by the particular application, and more particularly given the shape and size of the water containment means in the form of a reservoir 60, and with considering the volume and rate of flow of water passing through the apparatus 51 when used in a river, stream, lake or within a more restrictive vessel such as water flowing through a pipe (not shown). Preferably the electrode 52 has a high surface area, and may desirably be circular in cross section such that the voltage gradients induced by the active electrode 52 radiate outwardly from the electrode 52 in a substantially uniform manner.

According to one non-limiting embodiment of the invention the electrode 52 is a stainless steel rod that is optionally about 12 millimetres in diameter, and can advantageously be adapted with a tapered end or pointed tip 53 to increase the voltage gradients generated by the active electrode 52. The size of the electrode 52 can be of any suitable size or diameter and length and composition causing an electrostatic field to be set up in the water when a relatively low voltage charge, as disclosed herein, is applied to the electrode 52.

The electrode 52 is associated with or suspended in a body of water 55 by means of a floatable platform 54. The platform 54 is composed of a material having a lower density than water to allow floatation of the apparatus 51 in the water 55. It is considered that the platform can be suitably tethered or supported in place as required, particularly in applications where the body of water 55 is flowing passed the apparatus 51.

It is seen that the apparatus 1 may include at least two suitably spaced apart electrodes 52 that are electrically connected together and mounted to at least one or more floating platforms 54, as required. Any suitable and known form of attachment means to attach the electrodes 52 to a supporting structure or the platform 54 is provided. The plurality of electrodes 52 may optionally be configured in a spaced apart circular arrangement that desirably sets up a strong voltage gradient in the water 55.

In this non-limiting embodiment of the invention, the floating platform 54 is optionally constructed of a material such as polystyrene, although it will be appreciated that the platform 55 can be constructed from any durable and resilient material having a lower density than the water being treated by the treatment process so as to float on the water and being capable of supporting the electrode 52. Alternatively, the electrode 52 can be otherwise supported or suspended in a body of water by any mechanical means or any other suitable method of suspension.

The apparatus 51 includes a suitable power supply means 61 adapted to supply a charge to the electrode 52. The adaptation can include a converter 62 that can transform input voltage AC to output DC for supply to the electrode 52. Other circuitry can be employed to filter and/or transform the voltage to a suitable DC voltage output for feeding the electrode 52. The power supply means 61 is configured to enable the electrode 52 to induce an electrostatic charge in the water 55. In this embodiment, it is seen that an external power supply such as mains power supply of 120 volts AC will be suitably converted and transformed using a suitable transformer means to supply a voltage of substantially between about −25 to −600 volts DC. More preferably, but not exclusively, the preferred voltage range applied for many applications is between −32 and 100 volts DC. It is envisaged that a higher voltage may be applied to treat large bodies of water.

Advantageously the voltage selected is variable to suit the particular application of the apparatus 51. It is envisaged that higher voltages could be applied in some applications although in most typical applications a voltage of between −25 and −100 v DC is considered sufficient for the treatment of water. A power cable 56 will then feed power to the electrode 52. The power cable 56 is advantageously insulated and is attached or coupled to the electrode 52 as required. It is seen that the preferred voltage selected for supply can vary, and depends in part on the particular application of the apparatus 61, and with considering the desired voltage gradient required in the body of water 55 of the reservoir 60 to treat the particular water type and conditions of the water 55.

It is seen that the amount of negative electrostatic voltage charge applied to the electrode 52 is proportional to the voltage gradients of the electrostatic field induced in the water 55. It will be appreciated that the field strength of the voltage gradients can be predicted using Coulomb's inverse square law stating that the magnitude of the electrostatic field between two charges is directly proportional to the magnitude of each charge and inversely proportional to the square of the distance between the two charges. The two charges in this embodiment being the negatively charged electrode 52 acting as a cathode and the wall of the reservoir 60 or other wall containing water or fluid being advantageously earthed at ground potential and functioning as an anode in the circuit.

It is seen that the higher the applied voltage or electrical potential difference between the anode and cathode (as two opposing points) in the electrical circuit of the installation, the steeper the voltage gradient in the water about the electrode 52. It is also considered that, within certain operating parameters and given the limitations of components of the apparatus 51, the higher the applied DC voltage and potential difference, the less time it will take for the electrostatic field to diffuse particles and the various cations and anions in the water to polarise in opposite directions. For example, the cations will group at the cathode electrode 52 and the anions will group at the anode, being the inner wall of the reservoir 60 or otherwise which is at a less negatively charged state or a more positively charged state relative to the electrode, or is at ground potential or earthed at ground potential when the electrode is not.

These variants with the voltage differential show that the potential difference between the designated cathode and anode in the circuit is an important aspect with considering the particular electrostatic field being set up in the body of water 55 and the desired application of the apparatus 51 in a particular body of water, whether in a faster flowing pipe or a large open body of water.

The power supply means 6 electrically associated with the electrode 52 is desirably a DC power supply adapted to supply a negative electrostatic low voltage charge to the apparatus 51.

In operation, the apparatus 51 is partially or fully submerged position in treatment reservoir 60 and a charge is supplied to the active electrode 52 in the system. The surrounding area then becomes part of the electrical circuit due to the electrostatic field set up about the electrode 52. It is considered that the electrode 52 sets up an electrostatic field that results in negative voltage charges being induced in the water having the highest potential difference at and adjacent the electrode 52, and reduces in the areas radiating away from the electrode 52 such that the lowest charge is located adjacent the inner walls 60a of the reservoir 60, the inner walls 60 being positively charged when referenced to the cathode. It will be appreciated that although areas remote from the electrode 52 may be exposed to a minimal charge, such areas such areas are considered the starting point of diffusion of inorganic cations. Furthermore, in accordance with an aspect of the invention, the voltage charge can be varied or adjusted quite substantially depending on the application, and such adjustment can be effective in increasing the rate of diffusion of the cations through the water and toward the electrode 52.

It is seen that the resulting electrostatic field forces inorganic ions in the water from their dissolved states and causes the ions to group into their pure states or state of origin. It will be appreciated that these groupings can occur at the poles of the gradients and the speed of which is relative to the charges presented by the ions. Further, ions group in the most negative or positive gradients available to them. Thus, for example, chemical elements such as calcium can respond faster than chemical elements such as manganese. Cations belonging to the isotopic group including sodium, magnesium, and hydrogen respond in the same manner, as its added mass does not change its electrical structure. Anions are attracted to the more positively charged inner wall or walls of the reservoir 60, that acts as an anode, and bond and revert back to states of origin thereto.

The electrode 52, when supplied with a voltage that is negative when referenced to earth or to the surrounding environment, is seen to function, in part, as an active electrode. This arrangement sets up an environment in the water about the electrode 52 whereby the installation is in circuit and the environment is used as a reference electrode.

It is seen that the cation groupings result in the formation of ionic crystalline compounds which continue to grow until all ions are collected. The ionic crystalline compounds can be subsequently removed and chemically treated to separate the compounds into their pure elements for reuse.

It will be appreciated that the electrode 52 can be configured and arranged in any desirable area within the reservoir 60, and may be conveniently arranged in an area where the resulting ionic crystalline compounds can be collected and removed. When arranged adjacent the bottom of the reservoir, the surface below the electrode 52 will induce stronger gradients and will collect cations in areas where gradients are alike or similar to the point of charge.

Additional suitable media capable of bonding with crystalline inorganic cations to its surfaces, such as, for example only, sand, crushed minerals or a combination thereof, can be introduced into the water in the conduit, reservoir or chamber effected by the induced voltage charge. As seen in FIG. 5, a removable tray 64, filled with suitable media 65, is optionally installed and act as a removable collection point. Further, a removable basket 66 containing suitable media 67, and wherein the basket 66 is provided with a rope 68 attached thereto, can also optionally be placed in the electrostatic field and serve to remove crystallised cations from the water.

It is envisaged that the electrode 52 may well be regularly removed as cleaned as required, as it will also serve as a collection point for cations in the water that are attracted to it.

Figure 7:
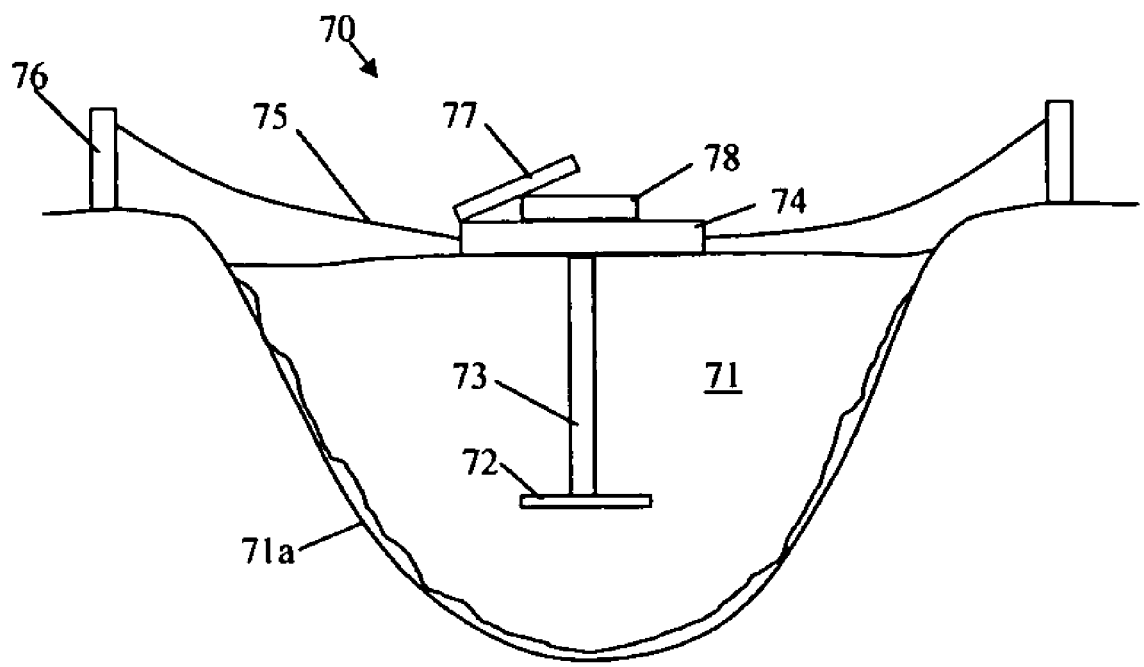
FIG. 7: illustrates a schematic side view of a water treatment apparatus 20 being supported in position in a river or stream in accordance with a fifth embodiment.
Figure 8:
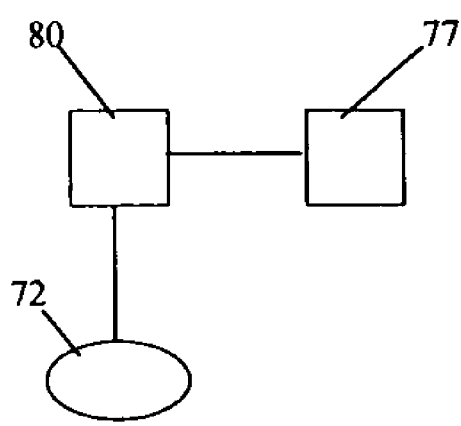
FIG. 8: illustrates a schematic block electrical diagram of the main components feeding power to the disc electrode of FIG. 7.

Referring now to FIGS. 7 and 8, a schematic side view of a water treatment apparatus 70 configured and arranged in a river 71 in accordance with an alternative embodiment, is illustrated.

The water treatment apparatus 70 of this embodiment is similar in many respects to the apparatus 51 as described with reference to FIGS. 5 and 6 and such similarities will not necessarily be repeated.

The apparatus 70 is adapted to treat water in a river 71, although similar applications such as the treatment of water in a pond, lake or the like is envisaged within the scope of the invention. In this embodiment a conductive active electrode 72 in the form of a disc, preferably a circular disc, is adapted to be attached adjacent the lower distal end of a non-conductive disc spacer means in the form of a spacer rod 73 that serves to submerge the electrode 72 at a desirable depth. The disc electrode is considered a desirable shape and size so as provide a sufficiently large surface area at the point of charge and in any secondary induced areas. More preferably in one non-limiting embodiment, the diameter of the disc is typically about 10 centimetres and about 2 millimetres in thickness, although it is considered that the dimensions of the disc electrode will vary depending on the application and the desired voltage gradients induced.

Furthermore, the rod 73 is desirably tubular in construction and non-conductive, and an electrical cable is fed through the central tubular section and electrically connected to the electrode 72 to supply a negative electrostatic charge to the electrode 72.

The near end of the rod 73 is attached to a floating platform 74. The platform 74 is desirably constructed of a water impervious outer layer surrounding a relatively low density material such as polystyrene that floats on water. It will be appreciated that the platform 74 can be constructed from any durable and resilient material having a lower density than the water being treated by the treatment process so as to float on the water and being capable of supporting the electrode 72 in position during operation.

The platform 74 is retained in position by platform retaining means desirably in the form of tether lines 75 attached to the platform at one end, and being attached at the other end to posts 76 at the side of the river 71. Alternatively the platform may be secured in position by a cantilevered arm arrangement or by any other known means of attachment.

The electrode 72 is supplied with a suitable voltage charge by a power supply means desirably in the form of suitable earthed solar cells 77 mounted on or about the platform 24, or alternatively may be mounted at the side of the river and a power cable supplying a suitable voltage charge is connected to the electrode 72. The use of solar cells 77 as a power source advantageously allows the platform 74 to be self sufficient and thus it is considered to be advantageous for applications in remote areas by being able to dispense with the need for a mains power supply. It is seen that as the output power from the solar cells may not be a suitable DC voltage, a variable transformer 80, including other electrical circuitry such as smoothing and filtering circuits, may be configured and arranged as required. The transformer 80 is therefore adapted to allow the selection of the required voltage for electrifying the active electrode 72.

It is considered that any desirable voltage forming a potential difference to ground potential can be applied, although typically a low voltage negative charge will be supplied to the electrode 82. Preferably the charge is in the range of between −25 to −600 volts DC, the charge being negative when referenced to ground potential. It is envisaged within the scope of the invention that the voltage charge can be adjusted as required to control the amount and/or rate of diffusion over time occurring in the water treatment system. It is seen that in application such as water flowing in a pipe, a higher voltage and potential difference between the cathode and anode of the circuit as applied may well be more suitable in the flow of water in a pipe, whereas a lower voltage applied resulting in slower bonding occurring over time may be suitable for treatment of water in tanks where the flow is much less evident. Further, the power source may be adapted to supply a variable voltage, and such voltage applied may be adjusted during the period of operation of the apparatus of the invention.

In an alternative embodiment it is seen that an active electrode can be placed into the immediate shoreline of a lake or river to target the potentially toxic ammonium cation ($NH_4+$), which enters lakes and rivers, inter alia, through surface runoff from agricultural or landscaped areas that use nitrate fertiliser or the like. It is seen that in this embodiment of the invention an active electrode can desirably utilise the capillary action of water within soil structures to collect the ammonium ion before it reaches the body of water. Various other applications of the water treatment system are also envisaged within the scope of the invention. For example, an active electrode can used in water for the collection of hydrogen, or placed in salt water to collect and remove sodium and/or chlorine.

In an application of the invention involving the recovery of hydrogen, it is considered that such recovery may be achieved using a disc electrode with a suitable hood collector encompassing the disc electrode acting as a cathode in the system (not shown). Alternatively, a tube or pipe may be used. The tube or pipe houses the active electrode and collects the hydrogen gas which is then delivered to a storage system. The device could be solar powered providing an efficient passive removal process, or otherwise. The collection of hydrogen desirably occurs under the water to eliminate air contamination and the hydrogen travels via a purged supply line to a storage system. The storage system could be standard condensed liquid types or more recent storage using carbon bonds. It is seen that a large number of suitably arranged electrodes supplied from an adapted passive power supply can be used to recover hydrogen economically without the use of additional mechanical devices. Further, oxygen can be collected at the anode part of the installation, being the result of a separate process, and both elements could be stored or used immediately for fuel cell supply.

In desalination, disc electrodes operating as the cathode part of the installation can be used in a preliminary process for removing the bulk of sodium, which subsequently returns to its original state and forms crystals at the cathode. This process desirably removes most of the sodium and chlorine content in water. Additionally, the process could also be used in conjunction with and complement secondary treatments. The bulk of sodium can be removed before secondary osmosis treatment, accelerating the osmosis process through increased flow through the semi-permeable membrane.

It is further seen that the invention can group metals of a precious nature to an active electrode. It is considered that gold is often found in a dissolved form in natural environments and as a result of mining practice. The placement of a negatively charged active electrode setting up a high or strong voltage gradients in the water may be used to treat water and recapture metals that, upon application, will group around the electrode accordingly.

Figure 9:
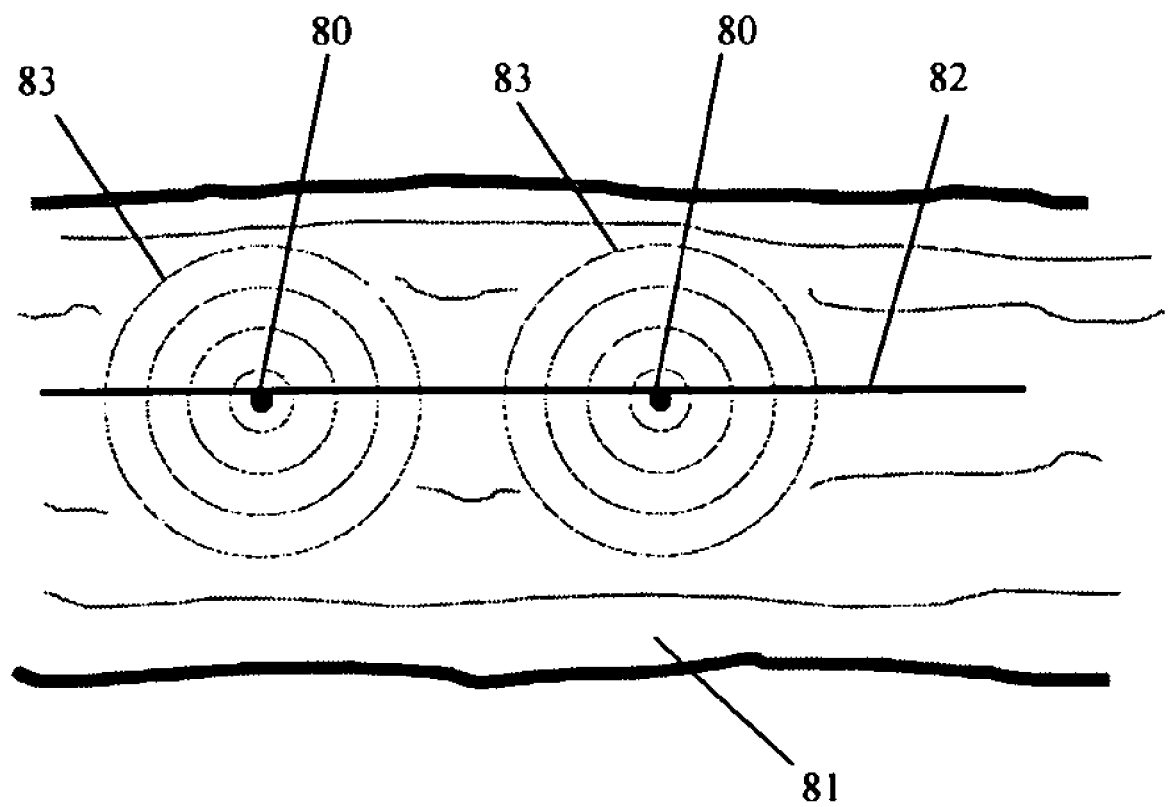
FIG. 9: illustrates a plan view of two spaced apart vertically aligned electrodes in a river or stream.

Referring now to FIG. 9, two spaced apart electrodes 80 positioned in a river or steam 81, is illustrated.

The electrodes 80, that can be configured and arranged substantially vertically in the flow of water, are suspended below a power cable 82 that serves to support the electrodes 80 in position. The electrodes 80 are spaced apart such that respective electrostatic fields 83 do not overlap or are kept reasonably separate. The amount of voltage applied to the electrodes 80, and the size of the electrodes 80, are factors determining the size of the electrostatic fields 83, although it is expected that the distance between electrodes 80 will be relative to the amount and type of contaminates being treated. It is seen that an arrangement such as the electrodes shown will increase the effectiveness of the treatment process of the invention, particularly in applications whereby the body of water is flowing passed the electrodes 80.

In an alternative embodiment, the electrodes 80 may be configured and arranged in a spaced apart circular arrangement of at least five electrodes (not shown). Other arrangements of electrodes are envisaged within the scope and spirit of the invention.

It will be appreciated that the apparatus 1 and applied methods and systems described herein and can form part of a broader or wider treatment process and can therefore function as one or more stages in the treatment process. Furthermore, the operation of the invention can serve to strip water of contaminants or separate at least the majority of the cations and anions in the water and then remove them.

It will be appreciated that materials used for most components of the invention include any suitable durable and resilient materials, for example only but not limited to, timber, metal, plastics materials, fabrics, rubber, glass or any combination thereof.

Wherein the aforegoing reference has been made to integers or components having known equivalents, then such equivalents are herein incorporated as if individually set forth. Accordingly, it will be appreciated that changes may be made to the above described embodiments of the invention without departing from the principles taught herein.

It is to be understood that the above description is intended to be illustrative, and not restrictive. Additional advantages of the present invention will become apparent for those skilled in the art after considering the principles in particular form as discussed and illustrated. Thus, it will be understood that the invention is not limited to the particular embodiments described or illustrated, but is intended to cover all alterations or modifications which are within the scope of the appended claims.

The invention claimed is:

1. A water treatment apparatus for use in the treatment of an open or closed body of water including water in a vessel, pipe, reservoir, river, chamber, lake or similar bodies of water, the water being retained in a water containment means being referenced or tied to ground potential, the apparatus including an energisable material defined as an active electrode being configured and arranged for placement in the body of water, the active electrode being adapted to be energised or electrostatically charged with a negative electrostatic voltage charge from a power supply means, in use, to induce and set up an electrostatic field in the water causing contaminants in the water effected by the induced charge to bond to solid surfaces in the water and to permit removal from the water, and wherein the energisable material is adapted to form part of a base platform configured and arranged for placement in the flow of wastewater, the platform having a substantial surface area and a plurality of spaced apart apertures therein, in use, for allowing water to flow therethrough, and wherein the side of the platform away from the incoming flow of water is covered with a media layer suitable for use in hosting bacterial cultures, and further including an electrified conductive mesh layer adjacent the media layer opposite the side in contact with the base platform, the mesh layer, in use, being supplied with an electrostatic negative voltage charge of between −0001 and −24 volts direct current to attract suspended solids in the wastewater and bond aerobic and/or anaerobic bacterial cultures to the media layer.

2. A water treatment apparatus according to claim 1 wherein the base platform is in the shape of a cylinder having a hollow central section adapted with a wastewater inlet, in use, allowing wastewater to flow therethrough the central section, and wherein the media layer is positioned substantially about the cylinder, and wherein the mesh layer is positioned substantially about the media layer and forming a negatively energised grid.

3. A water treatment apparatus according to claim 1 wherein the active electrode is adapted to be energised or electrostatically charged, in use, with a negative electrostatic voltage charge of between about −24 and −600 volts to induce and set up an electrostatic field with high voltage gradients in the water causing contaminants including inorganic dissolved cations in the water effected by the induced charge to diffuse and group toward the active electrode as the cathode, and anions to group toward anode points of charge in the field, and thus allow the bonding of the cations to the cathode and the anions to the anode and subsequent removal of said cations and anions.

4. A water treatment apparatus according to claim 1 wherein the electrode is suspended in the body of water by means of a floatable platform, the platform being tethered or secured in position in the water by a platform support means.

5. A water treatment apparatus according to claim 1 wherein the platform is provided with a power supply means adapted to supply power to the active electrode, such power being sourced from at least one solar cell to generate power that is fed to the power supply means being adapted with power filtering and conditioning means.

6. A water treatment apparatus according to claim 1 wherein the active electrode is a disc electrode suspended in the water by a non-conductive disc spacer means, the disc electrode having a large surface area and being positionable at a point in the electrostatic field subject to the induced charge.

7. A method of treatment of an open or closed body of water, the water being retained in a water containment means, such water being contained in a vessel, reservoir, river, lake or chamber or similar bodies of water being referenced or tied to ground potential, the method including the steps of:

a. placing an energisable material defined as an active electrode into the body of water;

b. energising the active electrode with a negative voltage charge relative to ground potential to induce an electrostatic field in the water, the negative voltage charge being applied to the active electrode is between about −25 and −600 volts direct current so as to induce and set up an electrostatic field with high voltage gradients in the water; and c. allowing contaminants in the water effected by the induced charge to bond to solid surfaces in the water and be removed from the water, the contaminants being removed in the water are inorganic dissolved cations in the water effected by the induced charge to diffuse and group toward the active electrode as the cathode, and anions to group toward anode points of charge in the field, and thus allow the bonding and subsequent removal of said cations and anions.

8. A method according to claim 7 further including step D. of removing crystalline compounds formed as a result of the water treatment process from the electrode and chemically treating the compounds to separate the compounds into their pure elements for reuse.

9. A water treatment system for use in the treatment of an open or closed body of water including water in a vessel, pipe, reservoir, river, chamber, lake or similar bodies of water, the water being retained in a water containment means being referenced or tied to ground potential, the system including an energisable material defined as an active electrode being configured and arranged for placement in the body of water, the active electrode being adapted to be energised or electrostatically charged with a negative electrostatic voltage charge from a power supply means, in use, to induce and set up an electrostatic field in the water causing contaminants in the water effected by the induced charge to bond to solid surfaces in the water and to permit removal from the water, the energisable material is adapted to form part of a base platform configured and arranged for placement in the flow of wastewater, the platform having a substantial surface area and a plurality of spaced apart apertures therein, in use, for allowing water to flow therethrough, and wherein the other side of the platform from the flow of water is covered substantially with a media layer suitable for use in hosting bacterial cultures, and further including an electrified conductive mesh layer adjacent the media layer on the other side from the base platform, the mesh layer, in use, being supplied with an electrostatic negative voltage charge of between −0001 and −24 volts direct current to attract suspended solids in the wastewater and bond bacterial cultures to the media layer.

10. A water treatment system according to claim 9 wherein the electrode is adapted to be energised or electrostatically charged, in use, with a negative electrostatic voltage charge of between about −24 and −600 volts direct current to induce and set up an electrostatic field with high voltage gradients in the water causing contaminants including inorganic dissolved cations in the water effected by the induced charge to diffuse and group toward the active electrode as the cathode, and anions to group toward anode points of charge in the field, and thus allow the bonding and subsequent removal of said cations and anions from the water.

* * * * *